United States Patent
He et al.

(10) Patent No.: US 10,752,167 B2
(45) Date of Patent: Aug. 25, 2020

(54) WARNING SIGNAL CONTROLLING DEVICE FOR BLIND ZONES WHEN VEHICLES MAKING A LANE CHANGE

(71) Applicant: JIANGSU HAIHUA AUTO PARTS CO., LTD., Danyang, Jiangsu Province (CN)

(72) Inventors: Yuncai He, Danyang (CN); Yuxiang Wu, Danyang (CN); Yuan Zhong, Danyang (CN); Junhua He, Danyang (CN)

(73) Assignee: JIANGSU HAIHUA AUTO PARTS CO., LTD., Danyang (CN)

( * ) Notice: Subject to any disclaimer, the term of this patent is extended or adjusted under 35 U.S.C. 154(b) by 432 days.

(21) Appl. No.: 15/613,468

(22) Filed: Jun. 5, 2017

(65) Prior Publication Data
US 2018/0208108 A1    Jul. 26, 2018

(30) Foreign Application Priority Data
Jan. 22, 2017 (CN) .......................... 2017 1 0045418

(51) Int. Cl.
| | | |
|---|---|---|
| *B60R 1/08* | (2006.01) | |
| *B60Q 1/52* | (2006.01) | |
| *B60Q 1/26* | (2006.01) | |
| *B60R 1/06* | (2006.01) | |
| *B60Q 5/00* | (2006.01) | |
| *B60Q 9/00* | (2006.01) | |
| *G08G 1/16* | (2006.01) | |
| *B60R 1/12* | (2006.01) | |

(52) U.S. Cl.
CPC ........... *B60Q 1/525* (2013.01); *B60Q 1/2665* (2013.01); *B60Q 5/006* (2013.01); *B60Q 9/008* (2013.01); *B60R 1/06* (2013.01); *B60R 1/08* (2013.01); *B60R 1/081* (2013.01); *G08G 1/162* (2013.01); *G08G 1/166* (2013.01); *G08G 1/167* (2013.01); *B60R 2001/1215* (2013.01)

(58) Field of Classification Search
None
See application file for complete search history.

(56) References Cited

U.S. PATENT DOCUMENTS

| | | | |
|---|---|---|---|
| 2009/0073590 A1* | 3/2009 | Englander | B60R 1/083 359/872 |
| 2012/0057362 A1* | 3/2012 | Fritz | G02B 6/003 362/494 |
| 2012/0200428 A1* | 8/2012 | Lynam | B60Q 1/2665 340/904 |

* cited by examiner

Primary Examiner — Benyam Haile
(74) Attorney, Agent, or Firm — Ladas & Parry LLP; Malcolm J. MacDonald

(57) ABSTRACT

A warning signal controlling device for blind zones when vehicles making a lane change is provided. The device is disposed inside each inner side of each rearview mirror of the vehicle, and comprises a lens masked by PMMA which is black and opaque, a mirror utilizing a light guide made of PMMA which is transparent, and a base assembly consisting of LED lamps, a PCB board and a base. The lens and the mirror are obtained by two-color molding, the PCB board is secured to the base, LED lamp holders are provided on the PCB board, the LED lamps are secured in the corresponding LED lamp holders and the base assembly is secured to the lens by ultrasonic welding.

7 Claims, 3 Drawing Sheets

WARNING SIGNAL CONTROLLING DEVICE FOR BLIND ZONES WHEN VEHICLES MAKING A LANE CHANGE

This application claims priority to Chinese application number 201710045418.8, filed on Jan. 22, 2017, with a title of WARNING SIGNAL CONTROLLING DEVICE FOR BLIND ZONES WHEN VEHICLES MAKING A LANE CHANGE. The above-mentioned patent application is incorporated herein by reference in its entirety.

TECHNICAL FIELD

The present invention relates to the technical field of vehicle-mounted devices, in particular to a warning signal controlling device for blind zones when vehicles are in a lane change.

BACKGROUND

With continuous expansion of the vehicle market, there are more and more vehicle users. Therefore, pressure on traffic is further intensifying, and traffic safety concerns have received increasing attention. For example, when changing lane while driving, the driver must be very careful, because a traditional way of determining whether another vehicle is present behind the vehicle in a lane change mainly relies on rearview mirrors of the vehicle, however some zones, i.e., blind zones, cannot be seen through the rearview mirrors due to the limited field of view of the rearview mirrors. Therefore, in the case of presence of a vehicle in the blind zones, it is very common for a collision between the vehicle in a lane change and the vehicle in the blind zones.

The conventional exterior rearview mirrors have drawbacks of small field of view and large blind zones. Many traffic accidents occur due to a blind zone in the rear side region of the vehicle when overtaking or changing lane. To this end, many techniques of the prior art utilize an optical principle to decrease the radius of curvature of the rearview mirror so as to provide an increased field of view. However, this may bring about distortion of images in the rearview mirrors, which may cause wrong judgment of the drivers and thus lead to dangerous situations. Some other designs for eliminating blind zones also have a poor effect on completely eliminating the blind zone in the rear side region of the vehicle. Some techniques of the prior art involve installation of a camera on the exterior of the vehicle and a display device inside the vehicle. However, in this case, the drivers have to observe the rearview mirrors and the display device at the same time, and are thus distracted, and dangerous situations may thus be caused.

SUMMARY

In order to solve the above-described conventional technical problem, the present invention provides a warning signal controlling device for blind zones when vehicles making a lane change, which is simple and easy to handle, and can improve the security and reliability of driving.

A warning signal controlling device for blind zones when vehicles making a lane change according to the invention, disposed inside each inner side of each rearview mirror of the vehicle, comprising a lens masked by PMMA which is black and opaque, a mirror utilizing a light guide made of PMMA which is transparent, and a base assembly, consisting of LED lamps, a PCB board and a base. The lens and the mirror are obtained by two-color molding, the PCB board is secured to the base, LED lamp holders are provided on the PCB board, the LED lamps are secured in the corresponding LED lamp holders and the base assembly is secured to the lens by ultrasonic welding.

Preferably, a cavity or a light guide bar is provided inside the lens, and the LED lamps are placed in the cavity or at a light entrance of the light guide bar.

Preferably, a plurality of LED lamp holders are provided on the PCB board, and a control circuit is disposed inside the PCB board, wherein one end of the control circuit is connected to a circuit of the Body Controller Module (BCM) of the vehicle, and the other end is connected to the control circuit inside the PCB board.

Preferably, the number of the LED lamps is 2 to 6 and these LED lamps are configured to provide different alarm signals in the form of a flash, light staying for a short period, and light staying for a long period.

Preferably, the control circuit is provided with day and night modes.

Preferably, different display patterns are provided on a housing of the alarm signal controlling device.

Preferably, a controller inside the PCB board emits yellow light in a wavelength range of 586 nm to 592 nm, and according to lightness of surrounding environment and different positions of the driver and the passenger, four different illumination regions are provided at different positions for the day and night modes, wherein information about these four illumination regions is listed in tables below, information about a first illumination region at the position of the driver for the day mode:

| | Angle | | Luminance Value (cd/m$^2$) |
|---|---|---|---|
| Object | Horizontal | Vertical | Minimum |
| Position of the driver | 60 to 85 degrees | 7.5 degrees | 4500-9000 | information about a second illumination region at the position of the passenger for the day mode:

| | Angle | | Luminance Value (cd/m$^2$) |
|---|---|---|---|
| Object | Horizontal | Vertical | Minimum |
| Position of the passenger | 32.5 to 70 degrees | 7.5 degrees | 4500-9000 | information about a third illumination region at the position of the driver for the night mode:

| | Angle | | Luminance Value (cd/m$^2$) |
|---|---|---|---|
| Object | Horizontal | Vertical | Minimum |
| Position of the driver | 60 to 85 degrees | 7.5 degrees | 45-90 | information about a fourth illumination region at the position of the passenger for the night mode:

| | Angle | | Luminance Value (cd/m²) |
|---|---|---|---|
| Object | Horizontal | Vertical | Minimum |
| Position of the passenger | 32.5 to 70 degrees | 7.5 degrees | 225-450 |

The primary driver and the secondary driver can clearly view the light emitted by the controller from different directions, and the circuit of the BCM of the vehicle can provide a voltage of 13.5±0.1 V and a current of 46±6 mA and continuously supplies stable energy to the LED lamps through the controller, and the light is then emitted through the mirror and the lens.

The invention further provides a method for light detection. The alarm signal controlling device of the invention is run at a current of 50 mA and preheated for 5 min, the light intensity is concentrated on an eyellipse region. A measurement is performed for a measurement point A in this eyellipse region by a camera via the brightness. To perform the measurement, the entire module is required to be mounted in the rearview mirror. A brightness value of the central point in the entire eyellipse region is at least 9000 cd/m².

Brightness levels of the LED lamps of the invention can be adjusted. The flash, the light staying for a long period and the light staying for a short period are invisible to other vehicles, but can be seen by the drivers through glass from outside. The light can be used for monitoring distances between both sides or the rear of the vehicle making a lane change and other vehicles. The alarm signals can pass through the housing of the device in the form of a flash, light staying for a long period and light staying for a short period so as to alert the driver to vehicles nearby or in blind zones. The alarm signal controlling device of the invention is simple and easy to handle, and can improve the security and reliability of driving.

Compared with the existing techniques, the present invention has some beneficial effects which will be described below.

There is no interference from the device of the invention to vehicles behind, since the device of the invention is provided inside each inner side of each rearview mirror and light reflecting regions have been adjusted in the design process, thereby achieving independent focus of the light at positions of the primary driver and the secondary driver.

Three groups of light emitting units are provided in the device, and the light directly acts on the entire lens and is then directly transmitted to the surface of the mirror, increasing the light utilization efficiency.

Brightness levels of the LED lamps can be adjusted according to lightness of surrounding environment, and the display information of auxiliary lamps can also be identified when the ambient is bright.

The controller emits signals in the form of a flash, light staying for a long period and light staying for a short period. Turn-on of turn lamps sends a message indicating that the vehicle is about to make a lane change. The steering operation is viewed as a standard of auxiliary lamps update. At this time, a second grade of the auxiliary lamps is activated, and the light blinks for a short period. After the turn lamps are turned off, the light emitted by the controller is restored to stay for a long period and provides an alert for the drivers when a lane change is made.

BRIEF DESCRIPTION OF THE DRAWING

Other characteristics, details and advantages of the invention shall appear when reading the following description provided by way of a non-limiting example, in reference to the annexed drawings wherein.

DETAILED DESCRIPTION

Figure 1:
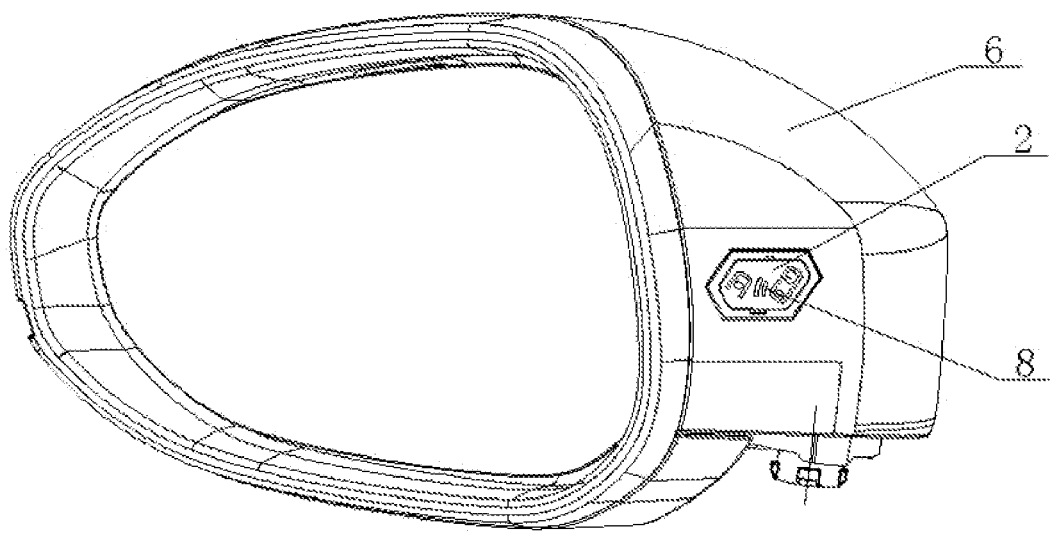
FIG. 1 is a schematic view of an embodiment of a warning signal controlling device according to the invention.
Figure 2:
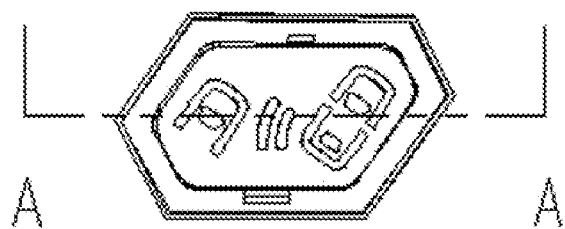
FIG. 2 is a front view of the warning signal controlling device.
Figure 3:
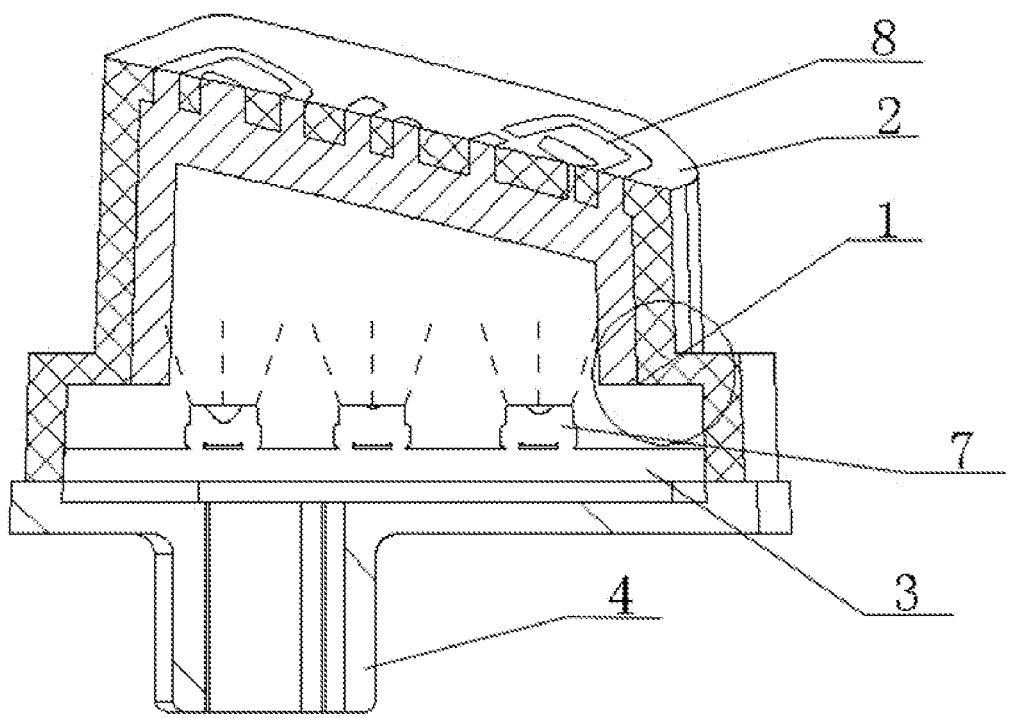
FIG. 3 is a sectional view taken along the line A-A in FIG. 2.
Figure 4:
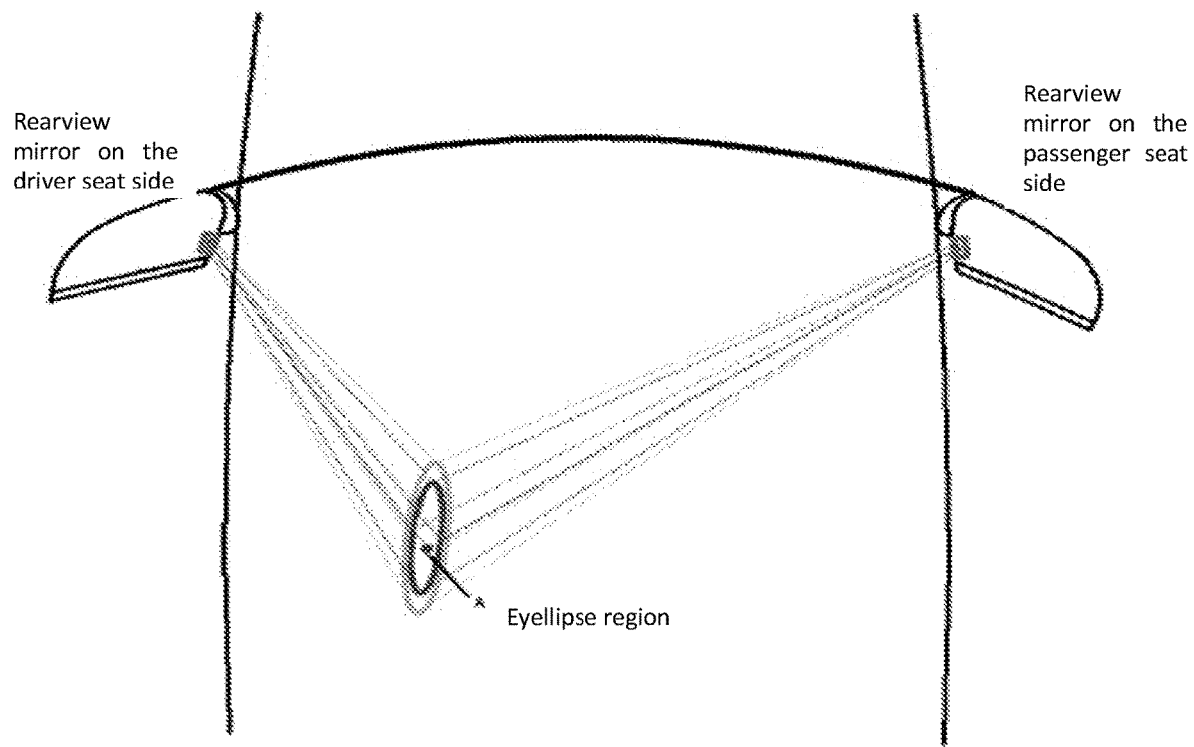
FIG. 4 shows an analogy of focusing light at a driving position.
Figure 5:
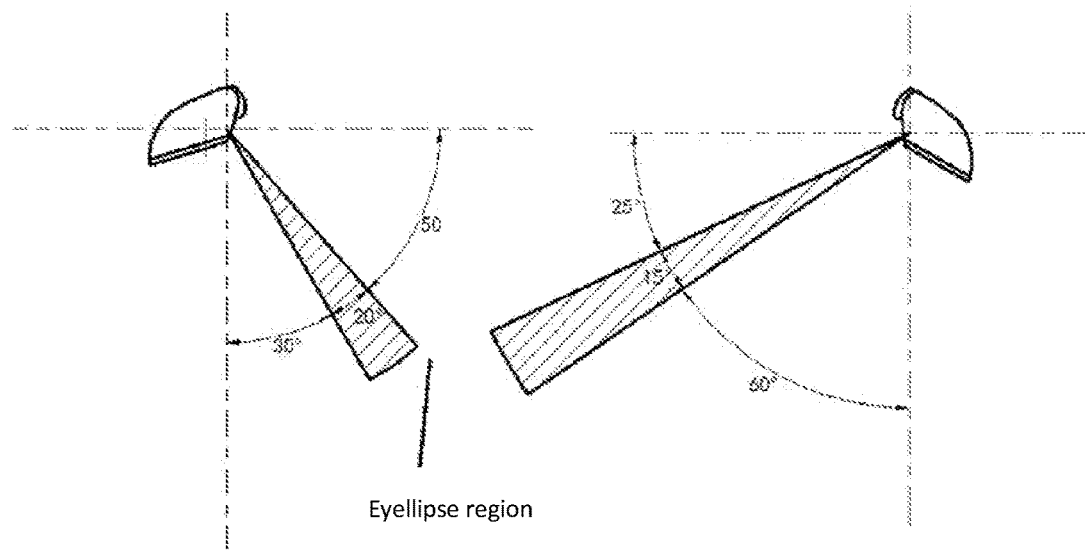
FIG. 5 shows an analogy of receiving light at the driving position.

As shown in FIGS. 1 through 5, a warning signal controlling device for blind zones when vehicles making a lane change according to the invention, disposed inside each inner side of each rearview mirror of the vehicle, including a lens 1, a mirror 2 and a base assembly. The lens 1 and the mirror 2 may be obtained by two-color molding. The lens 1 may be masked by PMMA which is black and opaque, and the mirror 2 may utilize a light guide made of PMMA which is transparent. The base assembly consists of LED lamps 7, a PCB board 3 and a base 4. The PCB board 3 is secured to the base 4. LED lamp holders are provided on the PCB board 3. The LED lamps 7 are secured in the corresponding LED lamp holders. The base assembly is secured to the lens 1 by ultrasonic welding.

Preferably, a cavity or a light guide bar is provided inside the lens 1, and the LED lamps 7 are placed in the cavity or at a light entrance of the light guide bar.

Preferably, a plurality of LED lamp holders are provided on the PCB board 3, and a control circuit is disposed inside the PCB board 3. One end of the control circuit is connected to a circuit of the Body Controller Module (BCM) of the vehicle, and the other end is connected to the control circuit inside the PCB board.

The number of the LED lamps may be 2 to 6 and these LED lamps may be configured to provide different alarm signals in the form of a flash, light staying for a short period, light staying for a long period, etc.

Preferably, the control circuit is provided with day and night modes.

Preferably, different display patterns are provided on a housing of the alarm signal controlling device.

The controller inside the PCB board emits yellow light in a wavelength range of 586 nm to 592 nm. According to lightness of surrounding environment and different positions of the driver and the passenger, four different illumination regions are provided at different positions for the day and night modes. Information about these four illumination regions is listed in tables below.

Information about a first illumination region at the position of the driver for the day mode:

| | Angle | | Luminance Value (cd/m²) |
|---|---|---|---|
| Object | Horizontal | Vertical | Minimum |
| Position of the driver | 60 to 85 degrees | 7.5 degrees | 4500-9000 |

Information about a second illumination region at the position of the passenger for the day mode:

|  | Angle | | Luminance Value (cd/m²) |
| --- | --- | --- | --- |
| Object | Horizontal | Vertical | Minimum |
| Position of the passenger | 32.5 to 70 degrees | 7.5 degrees | 4500-9000 |

Information about a third illumination region at the position of the driver for the night mode:

|  | Angle | | Luminance Value (cd/m²) |
| --- | --- | --- | --- |
| Object | Horizontal | Vertical | Minimum |
| Position of the driver | 60 to 85 degrees | 7.5 degrees | 45-90 |

Information about a fourth illumination region at the position of the passenger for the night mode:

|  | Angle | | Luminance Value (cd/m²) |
| --- | --- | --- | --- |
| Object | Horizontal | Vertical | Minimum |
| Position of the passenger | 32.5 to 70 degrees | 7.5 degrees | 225-450 |

The primary driver and the secondary driver can clearly view the light emitted by the controller from different directions.

The circuit of the BCM of the vehicle can provide a voltage of 13.5±0.1 V and a current of 46±6 mA. The BCM continuously supplies stable energy to the LED lamps through the controller, and the light is then emitted through the mirror and the lens.

The invention further provides a method for light detection. The alarm signal controlling device of the invention is run at a current of 50 mA and preheated for 5 min, the light intensity is concentrated on an eyellipse region. A measurement is performed for a measurement point A in this eyellipse region by a camera via the brightness. To perform the measurement, the entire module is required to be mounted in the rearview mirror. A brightness value of the central point in the entire eyellipse region is at least 9000 cd/m².

Brightness levels of the LED lamps of the invention can be adjusted. The flash, the light staying for a long period and the light staying for a short period are invisible to other vehicles, but can be seen by the drivers through glass from outside. The light can be used for monitoring distances between both sides or the rear of the vehicle making a lane change and other vehicles. The alarm signals can pass through the housing of the device in the form of a flash, light staying for a long period and light staying for a short period so as to alert the driver to vehicles nearby or in blind zones. The alarm signal controlling device of the invention is simple and easy to handle, and can improve the security and reliability of driving.

The descriptions above are just preferred embodiments of the invention, it will be apparent to those skilled in the art that various modifications and variations can be made without departing from the spirit or scope of the invention.

REFERENCE LIST

1 Lens
2 Mirror
3 PCB board
4 Base
5 Housing
6 Rearview mirror
7 LED lamp
8 Display pattern

What is claimed is:

1. A warning signal controlling device for blind zones when a vehicle makes a lane change, the device being disposed on an inner side of a driver's side rearview mirror of the vehicle, and on an inner side of a passenger's side rearview mirror of the vehicle, comprising:
   a lens masked by poly(methyl methacrylate) (PMMA) which is black and opaque,
   a mirror utilizing a light guide made of PMMA which is transparent, and
   a base assembly, consisting of LED lamps, a PCB board and a base;
   wherein, the lens and the mirror are obtained by two-color molding, the PCB board is secured to the base, LED lamp holders are provided on the PCB board, the LED lamps are secured in the corresponding LED lamp holders and the base assembly is secured to the lens by ultrasonic welding;
   wherein a controller inside the PCB board emits yellow light in a wavelength range of 586 nm to 592 nm, and according to lightness of surrounding environment and different positions of the driver and the passenger, four different illumination regions are provided at different positions for the day and night modes;
   wherein light emitted by the device disposed on the driver's rearview mirror, and light emitted by the device disposed on the passenger's side rearview mirror, converge to an eyellipse region of the driver, or the passenger, to form the four illumination regions;
   wherein information about the four illumination regions is listed in the tables below:
   information about a first illumination region of the four illumination regions at the position of the driver for the day mode:

|  | Angle | | Luminance Value (cd/m²) |
| --- | --- | --- | --- |
| Object | Horizontal | Vertical | Minimum |
| Position of the driver | 60 to 85 degrees | 7.5 degrees | 4500-9000 | information about a second illumination region of the four illumination regions at the position of the passenger for the day mode:

|  | Angle | | Luminance Value (cd/m²) |
| --- | --- | --- | --- |
| Object | Horizontal | Vertical | Minimum |
| Position of the passenger | 32.5 to 70 degrees | 7.5 degrees | 4500-9000 | information about a third illumination region of the four illumination regions at the position of the driver for the night mode:

| | Angle | | Luminance Value (cd/m$^2$) |
|---|---|---|---|
| Object | Horizontal | Vertical | Minimum |
| Position of the driver | 60 to 85 degrees | 7.5 degrees | 45-90 | information about a fourth illumination region of the four illumination regions at the position of the passenger for the night mode:

| | Angle | | Luminance Value (cd/m$^2$) |
|---|---|---|---|
| Object | Horizontal | Vertical | Minimum |
| Position of the passenger | 32.5 to 70 degrees | 7.5 degrees | 225-450 | wherein a line between the device disposed on the driver's rearview mirror, and the device disposed on the passenger's side rearview mirror, is a horizontal baseline;

wherein an angle in horizontal direction between at least one of the four illumination regions and the horizontal baseline is the horizontal angle;

wherein the device disposed on the driver's rearview mirror, and the device disposed on the passenger's side rearview mirror, are located on a reference horizontal plane, and wherein an angle in vertical direction between the illumination region and the reference horizontal plane is the vertical angle.

2. The device of claim 1, wherein a cavity or a light guide bar is provided inside the lens, and the LED lamps are placed in the cavity or at a light entrance of the light guide bar.

3. The device of claim 1, wherein a plurality of LED lamp holders are provided on the PCB board, and a control circuit is disposed inside the PCB board, wherein one end of the control circuit is connected to a circuit of the Body Controller Module (BCM) of the vehicle, and the other end is connected to the control circuit inside the PCB board.

4. The device of claim 1, wherein the number of the LED lamps is 2 to 6 and these LED lamps are configured to provide different alarm signals in the form of a flash, light staying for a short period, and light staying for a long period.

5. The device of claim 3, wherein the control circuit is provided with day and night modes.

6. The device of claim 1, wherein different display patterns are provided on a housing of the alarm signal controlling device.

7. The device of claim 5, wherein, the driver and the passenger can clearly view the light emitted by the controller from different directions, and the circuit of the BCM of the vehicle can provide a voltage of 13.5±0.1 V and a current of 46±6 mA and continuously supplies stable energy to the LED lamps through the controller, and the light is then emitted through the mirror and the lens.

* * * * *